(12) United States Patent
Larson et al.

(10) Patent No.: US 6,749,182 B1
(45) Date of Patent: Jun. 15, 2004

(54) BOLTED COLLECTOR FOR VAPOR LIQUID CONTACTING VESSEL

(75) Inventors: Kirk Fredrick Larson, Amherst, NY (US); Brian Kenneth Bodkin, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/303,030

(22) Filed: Nov. 25, 2002

(51) Int. Cl.[7] .................................................. B01F 3/04
(52) U.S. Cl. .................. 261/97; 261/110; 261/DIG. 85; 202/158
(58) Field of Search ........................ 261/97, 110, 114.1, 261/114.2, 114.3, 114.4, 114.5, DIG. 44, DIG. 85; 202/158

(56) References Cited

U.S. PATENT DOCUMENTS

| | | | |
|---|---|---|---|
| 3,053,520 A | * | 9/1962 | Streuber .................. 261/114.5 |
| 4,264,538 A | * | 4/1981 | Moore et al. .................. 261/97 |
| 4,381,974 A | * | 5/1983 | Furzer ......................... 202/158 |
| 4,427,605 A |   | 1/1984 | Meier et al. .................... 261/97 |
| 4,820,455 A |   | 4/1989 | Kunesh et al. ................. 261/96 |
| 5,122,310 A |   | 6/1992 | Ghelfi et al. .................... 261/97 |
| 5,158,713 A |   | 10/1992 | Ghelfi et al. .................... 261/97 |
| 5,240,652 A |   | 8/1993 | Taylor et al. .................... 261/97 |
| 5,464,573 A |   | 11/1995 | Tokerud et al. ................. 261/97 |
| 5,645,770 A | * | 7/1997 | McNulty et al. ............... 261/97 |
| 5,752,538 A |   | 5/1998 | Billingham et al. ........... 137/1 |
| 5,935,389 A | * | 8/1999 | Hine et al. ................... 202/158 |
| 6,086,055 A |   | 7/2000 | Armstrong et al. ........... 261/96 |

* cited by examiner

*Primary Examiner*—Scott Bushey
(74) *Attorney, Agent, or Firm*—Stanley Ktorides

(57) ABSTRACT

A liquid collector for use in a vapor liquid contacting vessel such as a distillation column having bolted or otherwise fastened components wherein liquid leakage is ameliorated by a collector tray divided into three overlapping levels including a center sump, deck plates and riser hats.

10 Claims, 3 Drawing Sheets

BOLTED COLLECTOR FOR VAPOR LIQUID CONTACTING VESSEL

TECHNICAL FIELD

This invention relates generally to vapor liquid contacting vessel internals and, more particularly, to liquid collectors. The invention will find use in any such vessel and is particularly useful in connection with a distillation column such as a cryogenic distillation column.

BACKGROUND ART

Liquid collectors, also known as chimney trays, are trays set below packed beds in a vapor liquid contacting vessel, such as a distillation column, which are used to gather the liquid that falls out of the bottom of the packing. This is done for two reasons. The first is to gather the liquid together so that it can be evenly distributed to the next lower packed bed. All or a portion of it can be withdrawn, or additional liquid can be added at this point. The second reason is to mix the gathered liquid together to even out any concentration gradients imposed by maldistribution in the bed above. The existing method of installing seal welded liquid collectors in vessels is the most time consuming and therefore most expensive part of the installation. The main reason for this is the time involved in seal welding all of the panels together. This welding of two thin sheets of metal is also difficult to perform properly. When it is done incorrectly gaps open at the collector perimeter allowing liquid to leak.

A leak free liquid collector which does not require seal welding of the parts would be highly desirable.

Accordingly it is an object of this invention to provide an improved liquid collector for use in a rectification column. The collector should be easily assembled using any practical and convenient method of attaching the parts.

SUMMARY OF THE INVENTION

The above and other objects, which will become apparent to those skilled in the art upon a reading of this disclosure, are attained by the present invention which is:

A collector for use in a vapor liquid contacting vessel comprising:

(A) a central sump having side walls defining a sump volume and having an axial length traversing the collector;

(B) a plurality of spaced deck plates oriented perpendicular to the sump, each deck plate attached to a central sump side wall by fastener means which are positioned over the sump volume; and (C) a plurality of riser hats, each riser hat positioned between spaced deck plates and overlapping a deck plate, and each riser hat fastened to a deck plate by fastener means positioned over such deck plate.

As used herein the term "deck plate" means a long narrow metal plate that is trough shaped in cross section and is closed at the outside end and open at the inside end in order to collect falling liquid and direct its flow into the center sump. The deck plates do the majority of the liquid collection.

As used herein the term "riser hat" means a long narrow metal plate positioned over the openings between deck plates to prevent falling liquid from leaking through the opening. Similar to the deck plate it is trough shaped, closed on the outside end and open on the inside end in order to direct its liquid into the center sump.

As used herein the term "bolt" means a fastener means comprising a threaded pin or rod with a head at one end designed to be inserted through holes in assembled parts and secured by a mated nut that is tightened by applying torque. Other fastener means which may be used in the practice of this invention include rivets, screws, spot welds, tack welds, cotter pins, and adhesives.

As used herein the term "column" means a distillation or fractionation column or zone, i.e. a contacting column or zone wherein liquid and vapor phases are countercurrently contacted to effect separation of a fluid mixture, as for example, by contacting the vapor and liquid phases on a series of vertically spaced trays or plates mounted within the column and/or on packing elements which may be structured packing and/or random packing elements. For a further discussion of distillation columns, see the Chemical Engineers' Handbook fifth edition, edited by R. H. Perry and C. H. Chilton, McGraw-Hill Book Company, New York, Section 13,

The Continuous Distillation Process

Vapor and liquid contacting separation processes depend on the difference in vapor pressures of the components. The high vapor pressure (or more volatile or low boiling) component will tend to concentrate in the vapor phase whereas the low vapor pressure (or less volatile or high boiling) component will tend to concentrate in the liquid phase. Partial condensation is the separation process whereby cooling of a vapor mixture can be used to concentrate the more volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is adiabatic and can include integral or differential contact between the phases. Separation process arrangements that utilize the principles of rectification to separate mixtures are often interchangeably termed rectification columns, distillation columns, or fractionation columns. Cryogenic rectification is a rectification process carried out, at least in part, at temperatures at or below 150 degrees Kelvin (K.).

DETAILED DESCRIPTION

Figure 1:
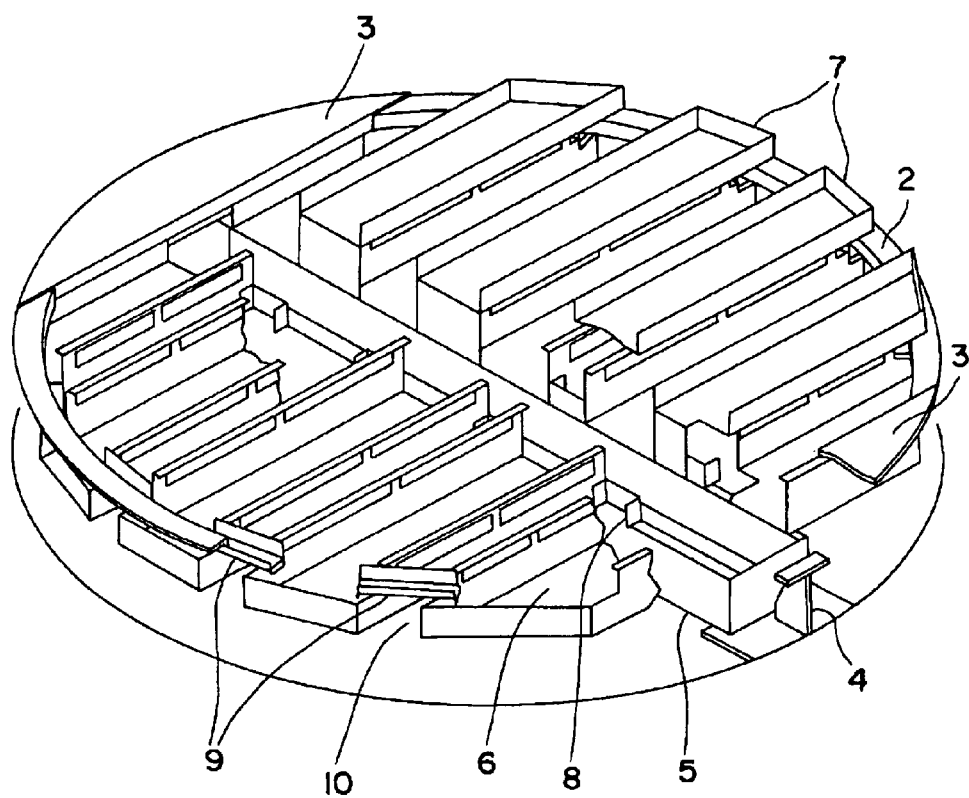
FIG. 1 is a perspective view of one embodiment of a bolted collector of this invention.

The invention is a liquid collector which preferably uses bolted joints rather than welds for its assembly. The novel design of the invention enables the use of bolts rather than seal welds without incurring liquid loss due to leakage which would otherwise occur with the use of bolts rather than seal welds under vapor liquid contacting heat and/or mass transfer conditions, particularly elevated pressure distillation conditions, which may be used in carrying out cryogenic rectification.

The invention will be described in greater detail with reference to the Drawings. The numerals of the Drawings are the same for the common elements. Referring now to FIGS. 1–4, the collector tray of this invention is preferably a bolted collector tray and has three overlapping levels; a center sump 5, deck plates 6, and riser hats 7. The levels are arranged so that there is an overlap wherever a bolted connection exists, so that a lower level of the collector will catch any leakage of liquid through the joint. A support angle has two major components, the support angle 2 itself and two wider side plates 3.

The collector tray bottom level, called the collector center sump 5 is a long rectangular box small enough in cross section to fit through the column manways. This box has no bolted joints in its bottom, and therefore will not leak. The next level is composed of spaced collector deck plates 6. These plates run perpendicular to the sump, out to the vessel shell 1. The deck plates 6 do the majority of the liquid collection. There are openings between deck plates for vapor to rise up 10. The deck plates bolt to the center sump walls, but the bolts are located above the center sump 5 so it will catch any leakage through the joint. The third level is the riser hats 7. They are also perpendicular to the sump and cover the riser openings 10 between the deck plates, collecting all of the liquid that would otherwise fall down the riser area 10 and directing it inwards, into the center sump 5 while still allowing vapor to rise up through the collector. The riser hats have a long flap on their inside ends to keep the cascading liquid from running into the inside ends of the riser openings 10. The riser hats 7 are bolted or otherwise fastened to the deck plates 6. Again, the joints are located such that any leakage will fall into the deck plates 6.

The riser end plates 8, bolt between the walls of adjacent deck plates 6 above the center sump side wall to block liquid from splashing down the front edge of the riser. Support angle 2 together with the side plates 3, runs completely around the collector and serves two purposes. The first is support. The riser hats 7 rest on the top surface of the support angle and also support the collector deck plates 6 which hang down from the riser hats 7. The second purpose the support angle serves is to divert or wipe all of the liquid that is attached to and running down the inside of the shell 1, into the collector. The support angle ring 2 is seal welded to the inside of the shell 1 as a part of the vessel fabrication and its angle shape serves to divert all liquid into the collector deck plates that are hanging underneath it. The side plates 3 are two chordal shaped widened portions of the support angle 2. As well as wiping the wall in their respective locations, the side plates 3 serve as a riser hat covering the area outside of the endmost collector deck plate 6. This area includes the area above the center sump supports 4 and the extreme ends of the center sump 5 itself.

Figure 2:
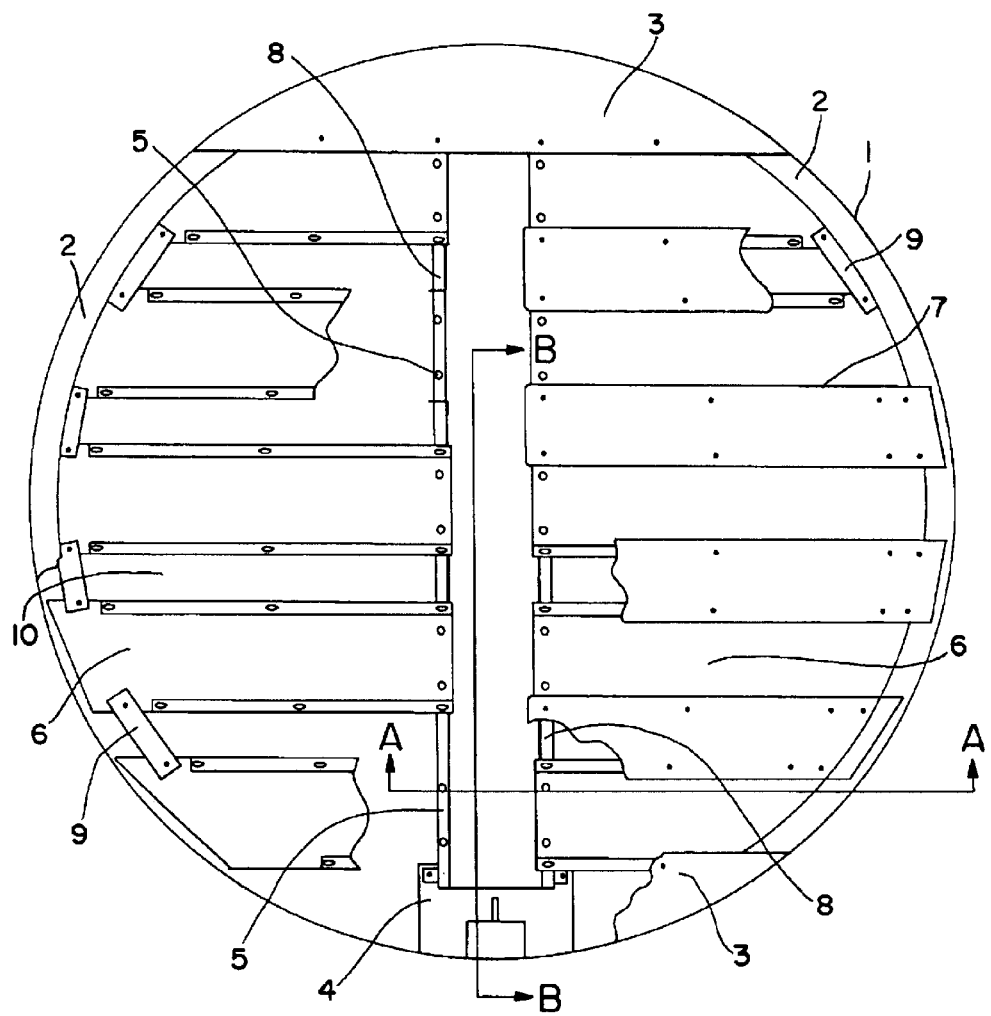
FIG. 2 is a plan view of the embodiment of the invention illustrated in FIG. 1.
Figure 3:
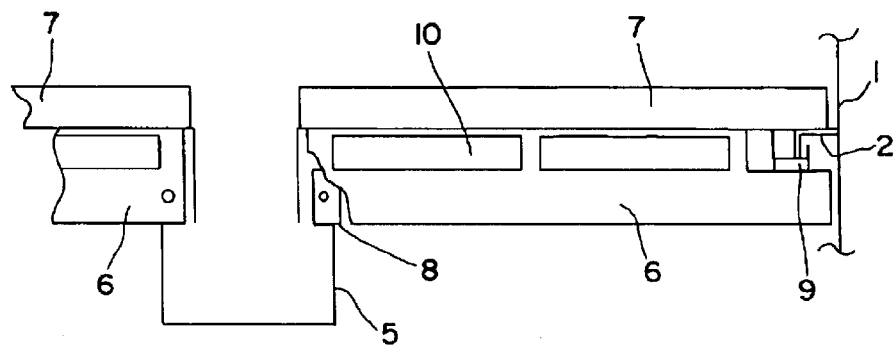
FIG. 3 is a cross sectional view of the embodiment of the invention illustrated in FIG. 2 taken along AA.
Figure 4:
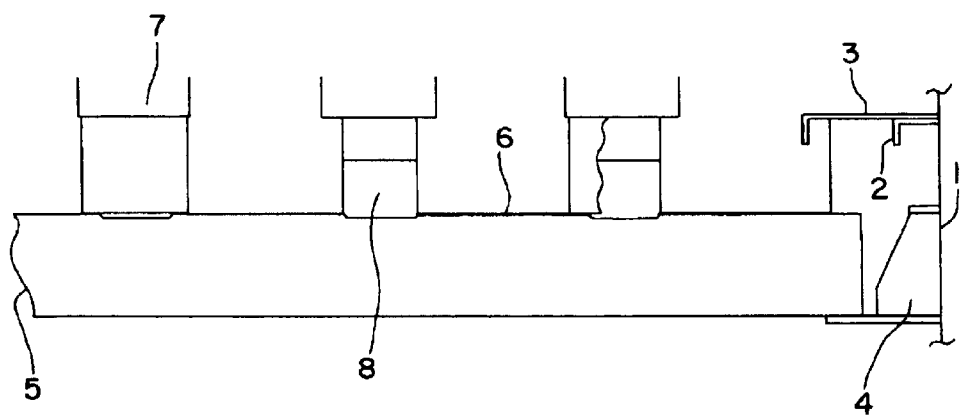
FIG. 4 is a cross sectional view of the embodiment of the invention illustrated in FIG. 2 taken along BB.

The last piece of the support angle is the drip channel 9. The drip channel 9 participates in both functions of the support angle 2. By bolting through the riser hat 7 and the drip channel 9, it serves as the clamp that holds the riser hat 7 to the angle ring 2. It does so in a fashion that allows for differential expansion/contraction between the collector and the shell. The location of these bolts is shown in FIG. 2. They are located such that any leakage through them will fall into the deck plates 6. The drip channel 9 also serves to catch any of the liquid running on the support ring 2 that happens to run underneath the end of the riser hat 7. This liquid will run to the end of the drip channel 9 and fall into the adjacent deck plates 6.

The collector of this invention may be constructed of any suitable metal. Vapor and liquid feeds and draws may be used in combination with the bolted collector. The collector may be made taller for larger liquid flows and shorter for small liquid flows. The termed bolted collector refers to any fastener means and is not limited to bolts as the fastener means.

Although the invention has been described in detail with reference to one preferred embodiment those skilled in the art will recognize that there are other embodiments of the invention within the sprit and the scope of the claims.

What is claimed is:

1. A collector for use in a vapor liquid contacting vessel comprising:
    (A) a central sump having side walls defining a sump volume and having an axial length traversing the collector;
    (B) a plurality of spaced deck plates oriented perpendicular to the sump, each deck plate attached to a central sump side wall by fastener means which are positioned over the sump volume; and
    (C) a plurality of riser hats, each riser hat positioned between spaced deck plates and overlapping a deck plate, and each riser hat fastened to a deck plate by fastener means positioned over such deck plate.

2. The collector of claim 1 further comprising a support angle attached to the vessel wall that provides mechanical support at the outside perimeter and diverts liquid flowing down the vessel wall back into the collector.

3. The collector of claim 1 further comprising a riser end plate for each riser hat wherein the riser hat is bolted to a deck plate at the riser end plate.

4. The collector of claim 1 further comprising a drip channel positioned to convey liquid onto the deck plates.

5. The collector of claim 1 further comprising at least one side plate which together with the support angle runs completely around the collector.

6. The collector of claim 1 wherein the fastener means comprises bolts.

7. The collector of claim 1 wherein the fastener means comprises at least one of rivets, screws, spot welds, tack welds, cotter pins, and adhesives.

8. The collector of claim 1 wherein the vapor liquid contacting vessel comprises a column.

9. The collector of claim 8 wherein the column is a distillation column.

10. The collector of claim 9 wherein the distillation column is a cryogenic distillation column.

* * * * *